Oct. 5, 1954     R. B. BEAN     2,690,927
FISH BAIT GRIPPER
Filed Nov. 27, 1950
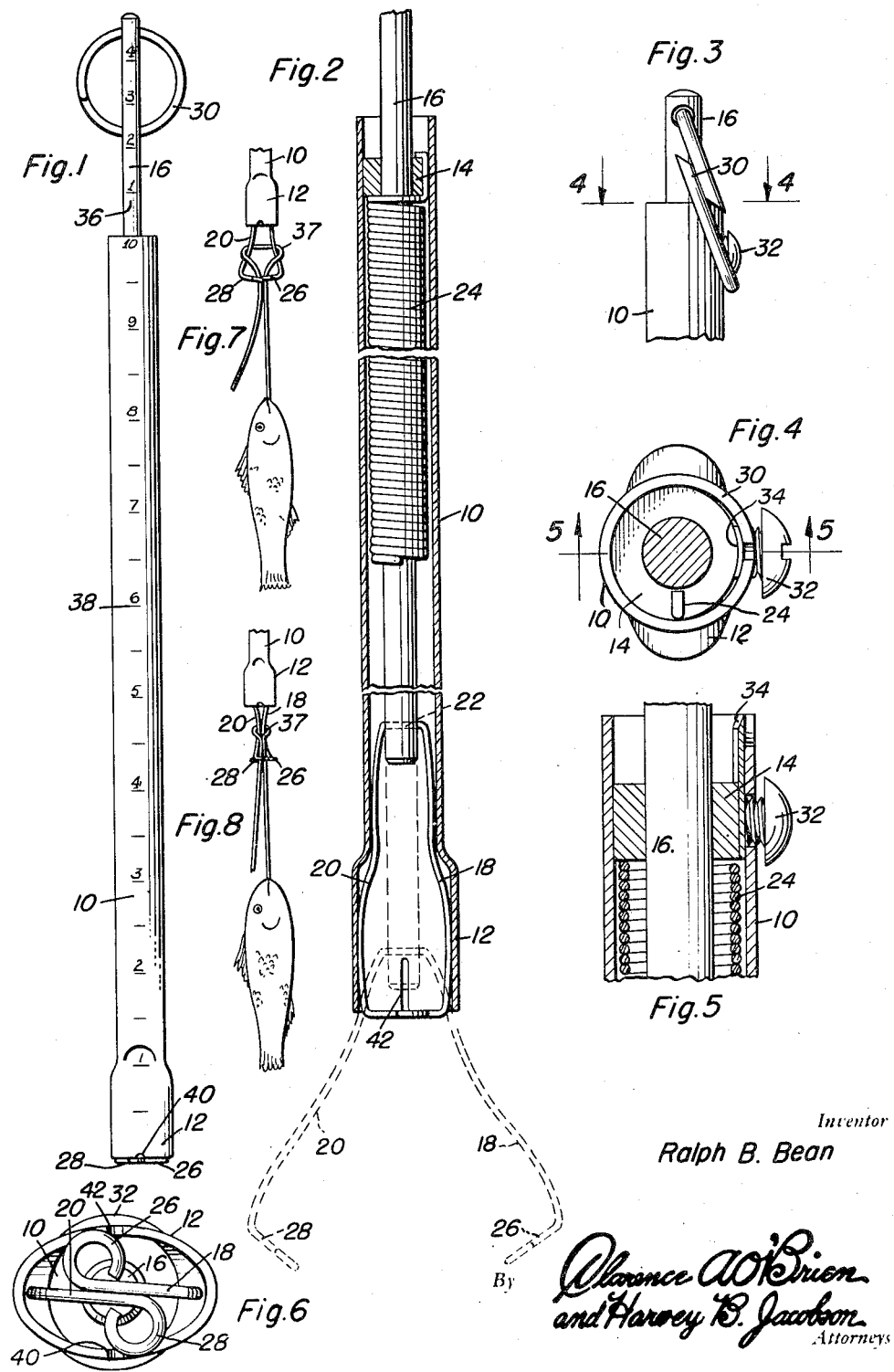
Inventor
Ralph B. Bean
By Clarence A. O'Brien
and Harvey B. Jacobson
Attorneys Patented Oct. 5, 1954

2,690,927

UNITED STATES PATENT OFFICE 2,690,927

FISH BAIT GRIPPER

Ralph B. Bean, Potosi, Mo.

Application November 27, 1950, Serial No. 197,691

4 Claims. (Cl. 294—100)

This invention relates to an appliance for use by fishermen and more particularly to a device adapted to catch and hold until hooked live fish bait.

It is an object of the present invention to provide a device with which minnows, crayfish and worms may be caught from containers and hoked on the hook of the fishing line without touching the bait with the hands.

Another object of this invention is to provide a device which is used to catch and hold fish bait which may also be used to weigh and measure a fish caught.

Still further objects of the invention reside in the provision of a fish bait gripper that is strong, durable, highly efficient in operation, light in weight, which will eliminate the chance of bait flopping from the fisherman's hands and getting away, and which is ideal for women or any other person who may not like to handle live bait with the hands.

These, together with the various ancillary objects of the invention which will become apparent as the following description proceeds, are attained by this fish bait gripper, a preferred embodiment of which has been illustrated in the accompanying drawings, by way of example only, wherein:

Figure 1 is a side elevational view of the fish bait gripper shown in a closed position;

Figure 2 is an enlarged fragmentary sectional and elevational view showing the detail construction of the invention;

Figure 3 is a fragmentary elevational detail showing the manner in which the elements of the present invention are locked prior to actuation;

Figure 4 is an enlarged sectional detail as taken along the plane of line 4—4 in Figure 3;

Figure 5 is a sectional detail as taken along the plane of line 5—5 in Figure 4;

Figure 6 is an end view showing in detail the construction of the spring retainer arms comprising important elements of the present invention; and Figures 7 and 8 are views showing how a fish is weighed using the present invention.

With continuing reference to the accompanying drawings wherein like reference numerals designate similar parts throughout the various views, reference numeral 10 is used to generally indicate the tubular outer member which is provided with an enlarged portion of oval shape sheath at its lower end. This portion is generally indicated by reference numeral 12. Secured in the tubular member 10 adjacent its upper end is a bushing 14 in which a rod 16 is slidably mounted. The rod at its lowermost end has attached thereto spring arms 18 and 20 which are attached to each other by means of a central portion 22 which extends through an aperture in the rod 16. A coil spring 24 coaxial with the rod 16 surrounds the latter and is secured to the bushing 14 at one end and to the rod 16 at its lowermost end.

The spring arms 18 and 20 are provided with lateral bends having end portions 26 and 28 which are fashioned into eyes and which are adapted to lie in the same plane against the lowermost end of the oval sheath portion 12 when withdrawn into the confines of said sheath portion 12.

Pivotally secured to the upper end of the rod 16 is a rod hold-down ring 30 which is adapted to engage a keeper in the form of a thumb screw 32 the shank of which passes through an aperture in the tubular member 10 and is threadedly screwed into engagement with the bushing 14. A steel blade 34 is also secured as a line cutter. Suitable indicia 36 are provided on the rod 16 in order to indicate the force required to displace the spring 24 so as to permit the rod 16 to extend downwardly and the spring arms 18 and 20 to extend outwardly of the oval portion 12. Thus, fish that are caught may be readily weighed by forming a loop 37 in the fish line and positioning the loop about and contracting the spring arms to prevent the spring arms from touching the sides of the portion 12 and binding.

Further, on the tubular member 10 there is provided suitable indicia 38 for measuring the length of any fish which may be caught. When it is desired to use this device for removing the hooks from a fish which may have been caught, such can be done because of the shallow notch 40 formed in one side of the oval member 12 and the other diametrically opposite deep notch 42 formed in the other side of the oval member 12 for engaging the hook when it is desired to use this as a hook remover. The shallow notch 40 provides a seat for the shank of the hook which is to be dislodged and the deep notch 42 serves as a keeper for the bill portion of the hook. By projecting the arms 18 and 20 slightly beyond the end 12 of the tubular member, the free eye-equipped ends 26 and 28 may then embrace and grapple the fishing line. Now, the device may be slid or piloted along the line into the mouth of the fish and the fish hook caused to seat itself in the notches 40 and 42 with sufficient of a gripping action for disgorging said fish hook. In this connection, it is to be noted that the notches are at right angles to the lateral bends 26 and 28.

This device is operated as follows: When the ring 30 is caught over the head of the stop member 32 (Fig. 3), the fish grip is ready to catch live minnows, crayfish or any active bait. By holding the fish gripper in the right hand with the forefinger and middle finger astride the tubular mmeber 10 and against the bottom of the ring 30 with the right thumb lightly touching the head of the screw or stop member 32, the rod 16 can be instantly released by pressing the thumb against the stop member 32 and urging the ring upwardly over the stop member 32. Before releasing, the spring arms are placed over the bait until the offset eyes or jaws 26 and 28 are underneath the bait. Then, the rod 16 is released, which urges the spring arms 18 and 20 to close against the sides and bottom part of the bait, whereby to satisfactorily catch hold of the bait for reliable handling and placement on a fish hook (not shown).

Since, from the foregoing, the construction and advantages of this device are readily apparent, further description is believed to be unnecessary.

However, since numerous modifications and equivalents of this fish bait gripper will be readily apparent to those skilled in the art, it is not intended to limit the invention to the precise embodiment shown and described, but all suitable modifications and equivalents may be readily resorted to which fall within the scope of the appended claims.

Having described the invention, what is claimed as new is as follows:

1. A fishing appliance comprising a tubular outer member having upper and lower ends, a rod slidably positioned in said member, spring arm for gripping secured to one end of said rod, the other end of said rod extending beyond the upper end of said tubular member, spring means for urging said rod outwardly of said upper end and said spring arms inwardly of said tubular member at the lower end, holding means on said rod and said tubular member selectively preventing said spring means from urging said spring arm inwardly of said tubular member, the lower end of said tubular member being of greater cross-section than the principal cross-section of said tubular member for reception of said spring arms, said spring arms including laterally bent free end portions adapted to lie in a common plane when said spring arms are fully withdrawn into said lower end of the tubular member, a bushing fitting in said tubular member, said rod slidably extending through said bushing, said spring housed in said tubular member and means comprising a coil spring coaxial with and encircling said rod and secured at one end to said bushing and at the other end to said rod, said holding means comprising a hold-down ring pivotally secured to said other end of said rod, and a screw passing through an aperture in said tubular member and joined to said bushing, said ring being adapted to releasably engage said screw.

2. A multipurpose utility implement for use by fishermen comprising an elongate tubular member, a rod slidably mounted in said tubular member, a coil spring encircling said rod, confined in said tubular member, and secured at one end to the latter and at its opposite end to said rod, the upper end of said rod projecting beyond the corresponding upper end of said tubular member under the influence of said spring and being provided with readily visible scale graduations oriented with the upper end of said tubular member, and a pair of diametrically opposite spring arms secured at their inner ends to the adjacent lower end of said rod, said arms being normally confined in said tubular member by way of the tension of spring returned rod, the outer end portions of said arms being free and bent laterally toward each other and terminating in duplicate eyes, the latter being coplanar with said laterally bent ends and with each other and engaging the adjacent lower end of said tubular member when the arms are wholly withdrawn and confined in said tubular member.

3. The structure defined in claim 2, and the combination therewith of a hold-down ring pivotally connected to the upper end of said rod, and a headed keeper member carried by the upper end portion of said tubular member, said ring being releasably engageable with said keeper member and serving to retain said arms in a position projecting beyond said lower end, whereby said free ends spring apart for purposes of readily embracing and trapping a desired bait.

4. The structure defined in claim 2, wherein the lower end of said tubular member is provided with a pair of diametrically opposite fish hook seating and retaining notches, said notches being unable in conjunction with said laterally bent free ends and the latter being disposed at right angles to the positions of the notches.

References Cited in the file of this patent

UNITED STATES PATENTS

| Number | Name | Date |
|---|---|---|
| 163,406 | Platt | May 18, 1875 |
| 437,647 | Franklin | Sept. 30, 1890 |
| 626,052 | Carter | May 30, 1899 |
| 802,264 | Brown | Oct. 17, 1905 |
| 1,066,007 | Goodkowitz | July 1, 1913 |
| 1,168,115 | Rueckert | Jan. 11, 1916 |
| 1,187,193 | Smith | June 13, 1916 |
| 2,097,837 | Kaplan | Nov. 2, 1937 |
| 2,129,469 | Hedges | Sept. 6, 1938 |
| 2,320,967 | Dunkelberger | June 1, 1943 |